United States Patent [19]
Solomon et al.

[11] Patent Number: 4,878,239
[45] Date of Patent: * Oct. 31, 1989

[54] ANONYMOUS INTERACTIVE TELEPHONE SYSTEM WITH EXPANDED OUTWARD CALLING FEATURES

[75] Inventors: Merrill Solomon, Washington, D.C.; John Kimball, Germantown, Md.

[73] Assignee: The Telephone Connection, Washington, D.C.

[*] Notice: The portion of the term of this patent subsequent to Jul. 11, 2006 has been disclaimed.

[21] Appl. No.: 197,028

[22] Filed: May 19, 1988

Related U.S. Application Data

[63] Continuation-in-part of Ser. No. 83,645, Aug. 10, 1987, Pat. No. 4,847,890.

[51] Int. Cl.$^4$ .................. H04M 1/64; H04M 1/66
[52] U.S. Cl. ........................ 379/67; 379/196; 379/211; 379/213
[58] Field of Search ............... 379/67, 84, 82, 79, 379/188, 196, 197, 211, 213

[56] References Cited

U.S. PATENT DOCUMENTS

| 3,614,328 | 10/1971 | McNaughton et al. | 379/211 X |
| 3,626,109 | 12/1971 | Bartlett et al. | 379/197 |
| 3,959,600 | 5/1976 | Sousa | 379/157 |
| 4,313,035 | 1/1980 | Jordan et al. | 379/207 |
| 4,577,062 | 3/1986 | Hilleary et al. | 379/88 |
| 4,611,094 | 9/1986 | Asmuth et al. | 379/89 |

FOREIGN PATENT DOCUMENTS

| 0156058 | 12/1981 | Japan | 379/79 |
| 0096447 | 6/1983 | Japan | 379/211 |
| 0052954 | 3/1984 | Japan | 379/211 |
| 0142848 | 6/1986 | Japan | 379/211 |

Primary Examiner—Thomas W. Brown
Attorney, Agent, or Firm—Fleit, Jacobson, Cohn, Price, Holman & Stern

[57] ABSTRACT

Disclosed is a method and apparatus for establishing anonymous telephone communications between service subscribers and responding callers over public telephone lines controlled by a public telephone company central switching office having the capability of interlinking select public telephone lines. Communications between the subscribers and responding callers can be performed with complete confidentiality and mutual anonymity. Incoming calls from callers are transferred by a system controller and an additional subsystem to a message recording facility or directly to the desired subscriber. When a call is transferred directly to a subscriber, the static connection is made and maintained by the public telephone company's central switching office, and the system controller is disconnected from both caller and subscriber.

17 Claims, 11 Drawing Sheets

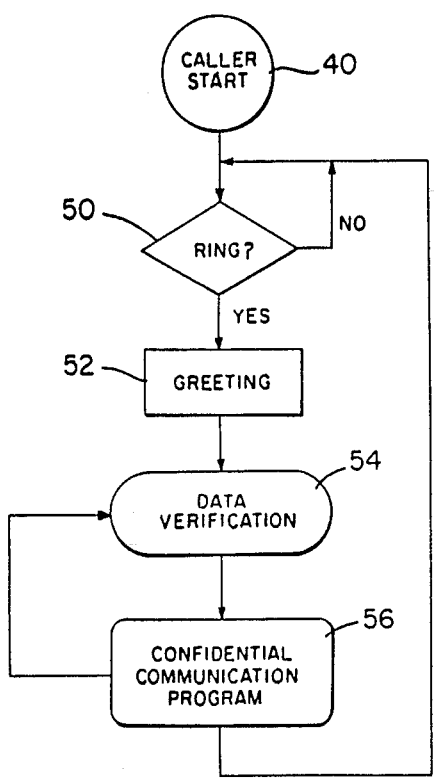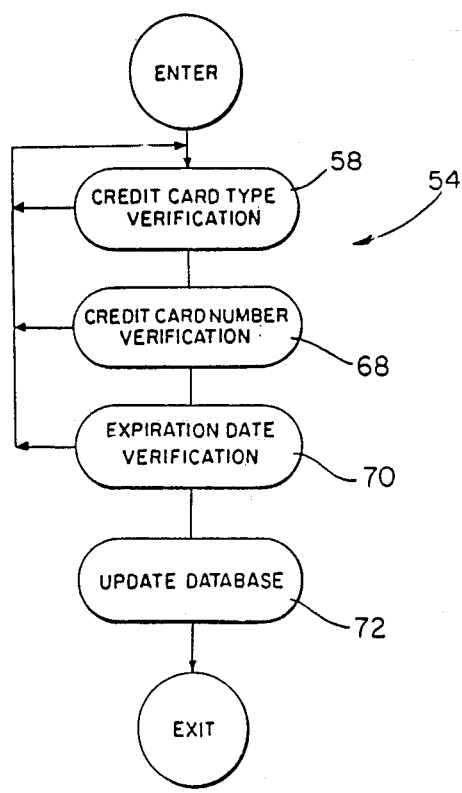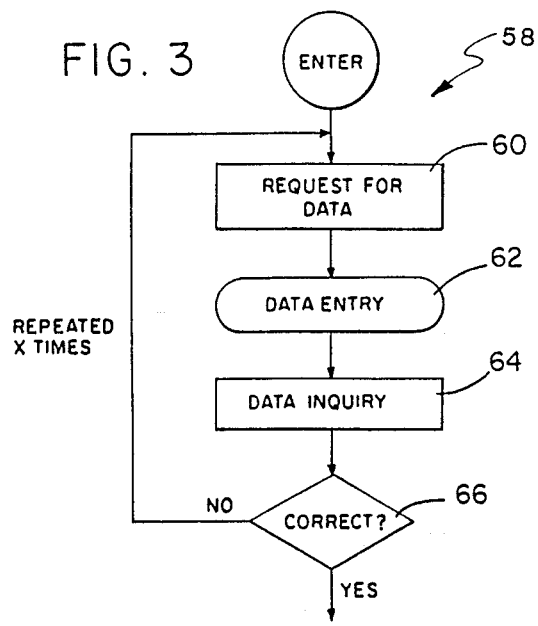

ANONYMOUS INTERACTIVE TELEPHONE SYSTEM WITH EXPANDED OUTWARD CALLING FEATURES

RELATED APPLICATION

This is a continuation-in-part of co-pending U.S. patent application Ser. No. 083,645, filed on Aug. 10, 1987, and entitled "ANONYMOUS INTERACTIVE TELEPHONE SYSTEM", now U.S. Pat. No. 4,948,890.

BACKGROUND OF THE INVENTION

The present invention relates to a method and a system for placing and responding to published advertisements.

Many magazines and newspapers regularly publish special classified sections commonly referred to as "personals" in which parties wishing to form relationships with other parties may place ads. The typical ad describes the person placing the ad, the type of relationship desired, and the type of person he or she would like to meet. Other persons reading such ads and also wishing to form personal relationships, will contact the person who placed the ad if their interests appear to coincide. Contact is established between such persons by mail, generally sent to a blind post office box keyed to a code appearing in the ad. The post office box is usually managed by the magazine or newspaper.

Some people hesitate to use the "personals", even though they are interested in establishing relations, because of a perceived indignity in the process. Others feel uncomfortable about revealing personal information to a stranger. And there are some who will not respond to a "personals" ad because they feel that they are unable to communicate effectively in writing. Finally, for all of those who use the "personals", there is no way of eliminating a delay of a few days or more between the appearance of an ad and the contact between two interested parties.

The aforementioned copending patent application describes a telephone system that favorably alters the perception about individuals who use "personals" and thereby increases the number of people placing and responding to such ads, that provides a "personals" service in which confidentiality and anonymity of all parties can be preserved if desired, and that provides a "personals" service in which responding to an ad can be accomplished without using the mailed letter format. Additionally, the copending application describes a "personals" service which enables an immediate and direct contact between a person answering an ad and the subscriber who placed the ad, and which provides the subscriber with the ability to modify the parameters of the service via the telephone.

While the copending application provides many features never before available in a standard classified advertisement system, such as the "personals", there remains the need to minimize the size of the system while still providing adequate and substantially unlimited service, especially when maintaining direct telephone contact between many persons answering ads and many subscribers who placed the ads.

SUMMARY OF THE INVENTION

This invention relates to an efficient telephone system through which mutually anonymous parties may conduct telephone communication with each other, without delay, and maintain such anonymous communication for as long as they desire.

In accordance with the present invention, as an example, "personals" ads are placed and published as previously known. A person reading an ad (herein referred to as the caller), and interested in establishing a personal relationship with the person who placed the ad (herein referred to as the subscriber), uses his or her telephone and calls a telephone number published in the "personals" column. The number called connects the caller to a central computer based system, and the caller is prompted by a voice prompting/recording and control system (by speech synthesis, recorded message, or the like) to enter the subscriber's reference number (SRN) furnished in the ad and unique to the subscriber. The voice prompting/recording and control system is connected to and controlled by the central computer based system. The computer then uses the subscriber reference number as an index to locate the subscriber's telephone number, and after verifying certain conditions to be explained below, automatically connects the caller to the subscriber. Only the computer is aware of the identity of a subscriber and a subscriber's telephone number (such is the same, when appropriate, for the identity of the caller and the caller's telephone number), and hence the parties can communicate with one another while being mutually anonymous for as long as they desire.

Furthermore, the telephone communication system of the present invention uses certain available features of the public telephone company (in particular, a service sometimes called the "Centrex" phone service) to connect a caller to a subscriber. After it is determined that the subscriber is available by availability information stored by the subscriber in the central computer, the caller is placed on hold at the telephone company's central office switching equipment. The subscriber's telephone number is then found in the interactive system's memory. This is accomplished by the voice prompting/recording and control system hook flashing the incoming line of the caller. The subscriber is then called and also put on hold by the voice prompting/recording and control system at the central office switching equipment. Finally, by hook flashing or some other means, the interactive system (herein sometimes referred to as the system) makes a connection between the caller and the subscriber at the telephone company's central office switching equipment, thus disconnecting the system from the line that originally was occupied by the caller, and thus making the line available for the next incoming call. A similar procedure is followed to connect a subscriber to a caller. Utilizing this technique, the total number of lines required by the interactive system to provide adequate service to all callers and subscribers is minimized; for the system needs only enough lines to simultaneously process a peak number of calls that are expected to come in at the same time, without having to consider the unknown and uncontrollable length of time that a caller and a subscriber may want to talk to one another.

If the subscriber to whom a call is placed is not available, or does not wish to answer the telephone, or if the subscriber's line is busy, or generally if the system is set up for receiving calls without immediate connection with a subscriber, the system offers the caller the ability to record a personal voice message for the subscriber. The caller is not, however, required to reveal his or her identity or telephone number to the subscriber in order to enable the subscriber to call back. Such a feature of the system is achieved by the computer assigning the caller a unique call back reference number (CBRN) that is indexed by the computer to the caller's telephone number. The call back reference number, if used, is automatically included with any voice message that was left by the caller. The subscriber then may return the call from the caller in a manner similar to that of a caller calling a subscriber, as explained above, by using the caller's call back reference number, and speak with the caller while maintaining complete privacy for both parties.

It is therefore an object of the present invention to provide an advertising system, such as a "personals" system, that offers the users the possibility of preserving anonymity, and the capability of rapidly exchanging personal thoughts in a manner that efficiently minimizes the need for dedicated telephone lines despite heavy usage of the system.

The above and other objects will become apparent when reference is made to the following description taken in conjunction with the accompanying drawings.

BRIEF DESCRIPTION OF THE DRAWINGS

FIG. 2 is a flow chart diagram illustrating the caller interfacing program associated with the telephone system depicted in FIG. 1.

FIGS. 2A and 2B are flow chart diagrams illustrating in greater detail portions o the caller interfacing program illustrated in FIG. 2.

FIGS. 3, 4 and 5 are flow chart diagrams illustrating in greater detail portions of the interfacing program illustrated in FIGS. 2, 2A and 2B.

DETAILED DESCRIPTION OF THE DRAWINGS

For purposes of disclosure, the present invention will be described as an interactive telephone system of the "personals" type. It should be understood, however, that the system finds use in other advertising environments.

Figure 1:
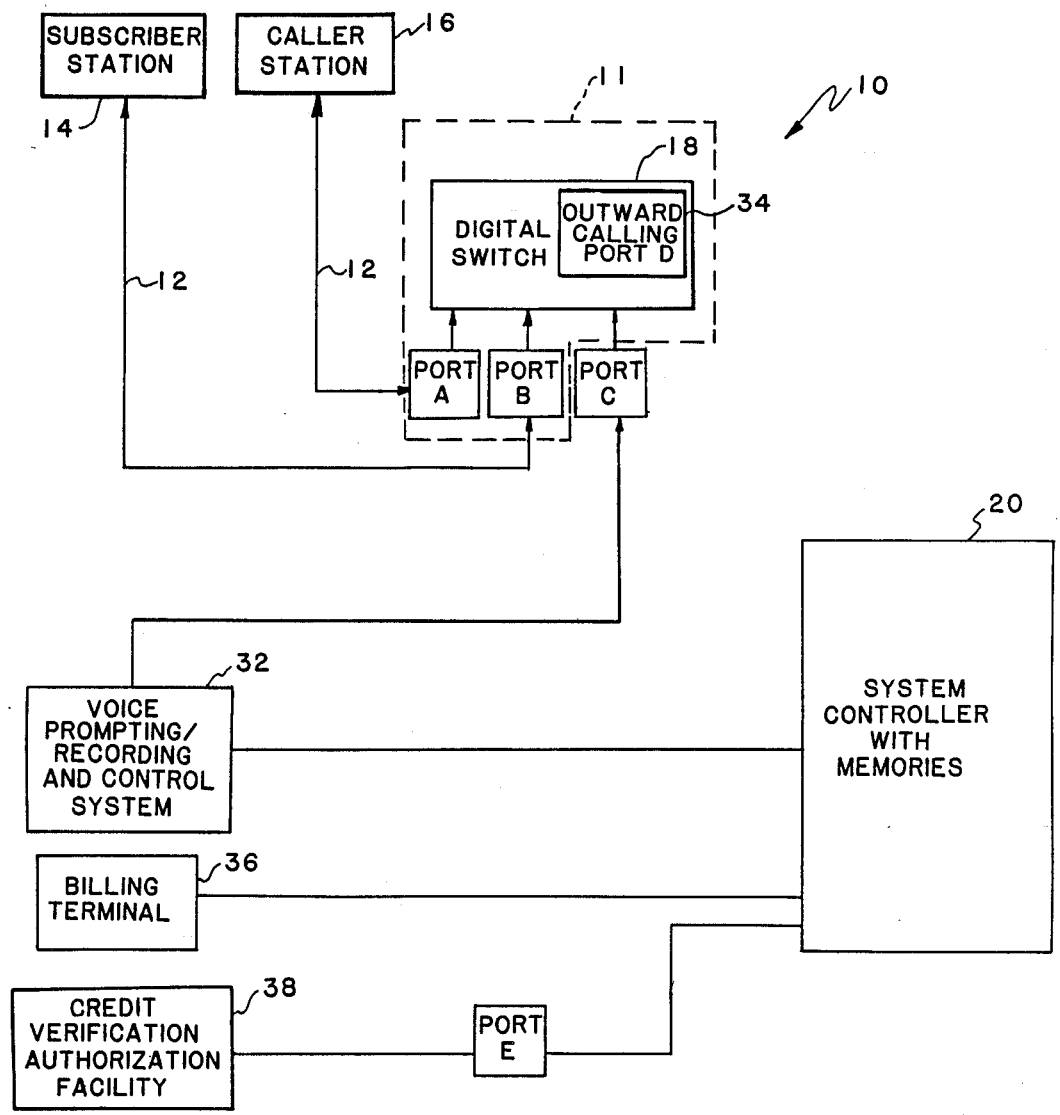
FIG. 1 is a block diagram illustrating the anonymous interactive telephone system of the present invention.

Referring first to FIG. 1, the anonymous interactive telephone system of the present invention is generally referred to by reference number 10. The interactive telephone system 10 involves the interlinking through the public telephone service (enclosed by dotted lines and referred to by reference number 11) of a subscriber to the "personals" service and an interested party (the caller). The subscriber has a telephone at a subscriber station 14, and the caller has a telephone at a caller station 16. The parties located at the respective stations 14 and 16 are mutually anonymous, but both are aware of the telephone number of the "personals" service through which communication with complete confidentiality is assured, all of which will be explained in detail hereinafter.

Through public telephone lines 12 and the public telephone service 11, a caller at a station 16 can reach an incoming trunk line of the system 10 at caller port A. This is accomplished by calling a telephone number published in the "personals" column. Similarly, the subscriber at station 14 can reach an incoming trunk line of the system 10 at subscriber port B, identified preferably by a second telephone number known only to the subscribers and to the "personals" service.

Ports A and B connect to a digital switch 18 whose functions are provided by the public telephone company. While not specifically illustrated, ports A and B, as well as other components to be described hereinafter, are integral with and/or connected to switch 18 through many lines; and other components to be described hereinafter, are integral with and/or connected to a system controller 20 through many lines, although only one line is illustrated for clarity. Further, although not illustrated, numerous known connecting components, such as modems for example, form part of the system 10.

A port C interlinks the digital switch 18 to a voice prompting/recording and control system 32, while an outward calling port D designated by the number 34, is connected to telephone company lines 12 and capable of connecting the caller station 16 and the subscriber station 14 to the digital switch 18. Next, a billing terminal 36 is connected to the system controller 20; and finally, a credit verification port E interlinks the system controller 20 with a credit verification/authorization facility 38.

Ports A, B, C, D, and E are illustrated as being functionally distinct and separate elements. However, as is well known in the art, connection ports of digital switches (such as switch 18) are indistinguishable until a particular line is connected to them. As such, ports A, B, C, D, and E may be considered as elements inherently included as part of the digital switch 18.

The function of the voice prompting/recording and control system 32 is two fold. First, the system 32 interacts verbally with the subscriber and caller. Second, system 32 interacts with the digital switch 18 to effect the connecting operations. Specifically, system 32, prior to attempting connection with a subscriber, hook flashes the incoming line of the caller to place the call on hold at the digital switch 18. Also, after it is determined that the subscriber is available, system 32 hook flashes the subscriber's line to connect the caller to the subscriber at the digital switch 18. The system 10 is then disconnected from the caller and subscriber.

The different operational steps and component connections referred to above and further described hereinafter are under the control of the digital switch 18, the system controller 20, and the voice prompting/recording and control system 32. System controller 20 can take the form of known general purpose computers, and includes memory capabilities for purposes discussed hereinafter. Thus, programmed operation of the system controller will provide the appropriate commands to various system components for affecting the different operational modes in accordance with the present invention.

The mutually anonymous parties at the subscriber and caller stations 14 and 16, interact with the system 10 of the present invention by available Touch-Tone telephone equipment in accordance with one embodiment of the invention. However, the present invention contemplates the use of speech recognition and other advanced forms of user inputs through which callers and subscribers may interact with the system.

The primary service provided by the system involves connecting together, over public telephone lines 12, a party at a subscriber station 14 and a caller at a caller station 16 for the purpose of establishing a confidential and mutually anonymous communication with one another; such communication can be initiated by either party. In operation, a subscriber places an advertisement for publication by a magazine, newspaper, or other media and provides unpublished information relating to availability for receiving calls, such as time of day, day of week and his/her telephone number.

The system 10 then stores the subscriber-provided information in the system's memory bank, and indexes the system controller 20 to a unique system-generated subscriber reference number (SRN) to be published in the subscriber's ad. The "personals" ad then is published, and it is read by potentially interested parties. A telephone number that will connect a caller to the system 10 is published with the ad.

A caller initiates telephone contact with the system 10 by calling the telephone number published in the "personals" column. The telephone is answered by the voice prompting/recording and control system 32 through the digital switch 18. The caller is prompted to enter credit card information (if this particular method of billing is selected from the various available methods) and then to enter a subscriber reference number by Touch-Tone input from his or her telephone. In response to entry of a SRN, the system controller 20 opens the file of the appropriate subscriber and reads the stored instructions. The voice prompting/recording and control system 32 then furnishes information through the telephone connection to the caller, based on stored instructions from the subscriber, or could even play a personal message previously recorded by the subscriber. The incoming call from the caller is then transferred either to the subscriber station 14 or the speech recording component within system 32.

If the call is made at a time acceptable to the subscriber, the voice prompting/recording and control system 32 signals the outward calling port 34 to call the subscriber station 14 at the stored telephone number. Once the telephone connection is established the voice prompting/recording and control system 32 preferably requests verification from the subscriber before connecting the caller to the subscriber; such verification could be accomplished by Touch-Tone of the subscriber's personal access code (PAC) or, alternatively, the subscriber's telephone number. Once it is verified that an authorized individual is on the telephone at the subscriber station 14, connection of the caller to the subscriber is permitted. At no time will either party know the identity or telephone number of the other party unless volunteered during the telephone conversation or otherwise previously volunteered.

Upon completion of the call the time duration of the call is sent to the system controller 20 and subsequently is transmitted to the billing terminal 36; the caller then is billed for the call on the basis of credit information previously obtained by the speech prompting component of the system 32, provided by the caller through his or her Touch-Tone telephone, verified by credit facility 38, and stored in the memory of the system controller 20. As noted previously, other billing techniques may be employed, such as direct billing by the telephone company on a per-call basis. If the incoming telephone call from the caller station 16 to the subscriber station 14 cannot be completed (line busy, no answer, wrong time or day), the call is directed to the speech recording section of system 32. In such case, the caller is asked whether he or she desires that the subscriber return the call, and if so, is requested by the speech prompting component of system 32 to furnish his or her telephone number, to be available only to the system controller. The caller then enters his or her telephone number by way of the Touch-Tone pad, which is indexed to the requested subscriber and stored in a database memory of controller 20. (This step may not be needed, depending upon the availability of certain services offered by the local telephone company.) The caller at that time is assigned a unique call back reference number (CBRN) that is announced to the caller by the voice prompting/recording and control system 32. As the next step, the caller is asked by the voice prompting/recording and control system 32 whether he or she wishes to furnish a voice message to the subscriber. Such a recorded message, if left, is stored in the voice recording component of system 32 for subsequent review by the subscriber to whom the message is addressed.

The subscriber may call into the system 10 at any time in order to review messages or to perform other tasks described hereinafter. Initial contact is made with the voice prompting component of system 32, as previously described with respect to the incoming calls from the caller, when the subscriber calls a telephone number of the subscriber port B. The voice prompting component of system 32, under the direction of the system controller 20, asks the subscriber for his or her identifying number, such as the subscriber reference number, and looks up the SRN in the memory bank of the system controller 20. Once the SRN is verified, recorded data and messages directed to that particular subscriber may be reviewed by the subscriber. The subscriber may then enter instructions to the system controller 20 regarding, for example, which calls, if any, are to be returned. The subscriber may return a telephone call from a caller by Touch-Tone entry of the caller's call back reference number furnished to the subscriber by the system controller 20 through the voice prompting component of system 32. Once again, connection is made between the caller and the subscriber without either party knowing the identity or telephone number of the other. Obviously, this would not be the case if the caller chose to leave his or her name and/or telephone number by way of the previously described voice message to the subscriber.

With reference now to FIG. 2, it will be explained how the system controller 20 is programmed to control the operation of the various components relating to speech prompting and recording, billing, and call transferring, for interfacing a caller station 16 with the system 10. The program is initiated by the caller as indicated at 40 in FIG. 2. When the telephone number of the caller port A is called, connection is initiated at 50. The voice prompting component of system 32, under control of the system controller 20 and a digital switch 18, transmits a greeting to the caller as indicated at 52, and requests certain data in order to initiate a data verification procedure 54. After data verification is complete, the caller can talk to or leave a message for a subscriber via communication program 56.

As shown in greater detail in FIG. 2A, the data verification procedure in accordance with one embodiment of the invention involves receiving credit card data in response to a request, and then searching a remote database (credit verification/authorization facility 38 of FIG. 1) for verification of the credit card number. Such data verification procedure is further detailed in FIG. 3, and is initiated by a request 60 for data followed by the caller's entry at 62 of the requested data. The caller then verifies at 64 that the data was correctly received, resulting in a decision 66 that the entered data should be utilized. If the entered data is not verified, the procedure is repeated a predetermined number of times, such as three, until verification occurs. If the entered data is not verified, then the incoming call is disconnected. The process continues to the next sequence if verification occurs.

With continued reference to FIG. 2A, following verification of the credit card type at 58, the credit card number is verified as indicated at 68. Then, the expiration date of the credit card is verified as indicated at 70. The verification procedure is completed by an update operation 72 of the database forming a part of the system controller 20.

Figure 2B:
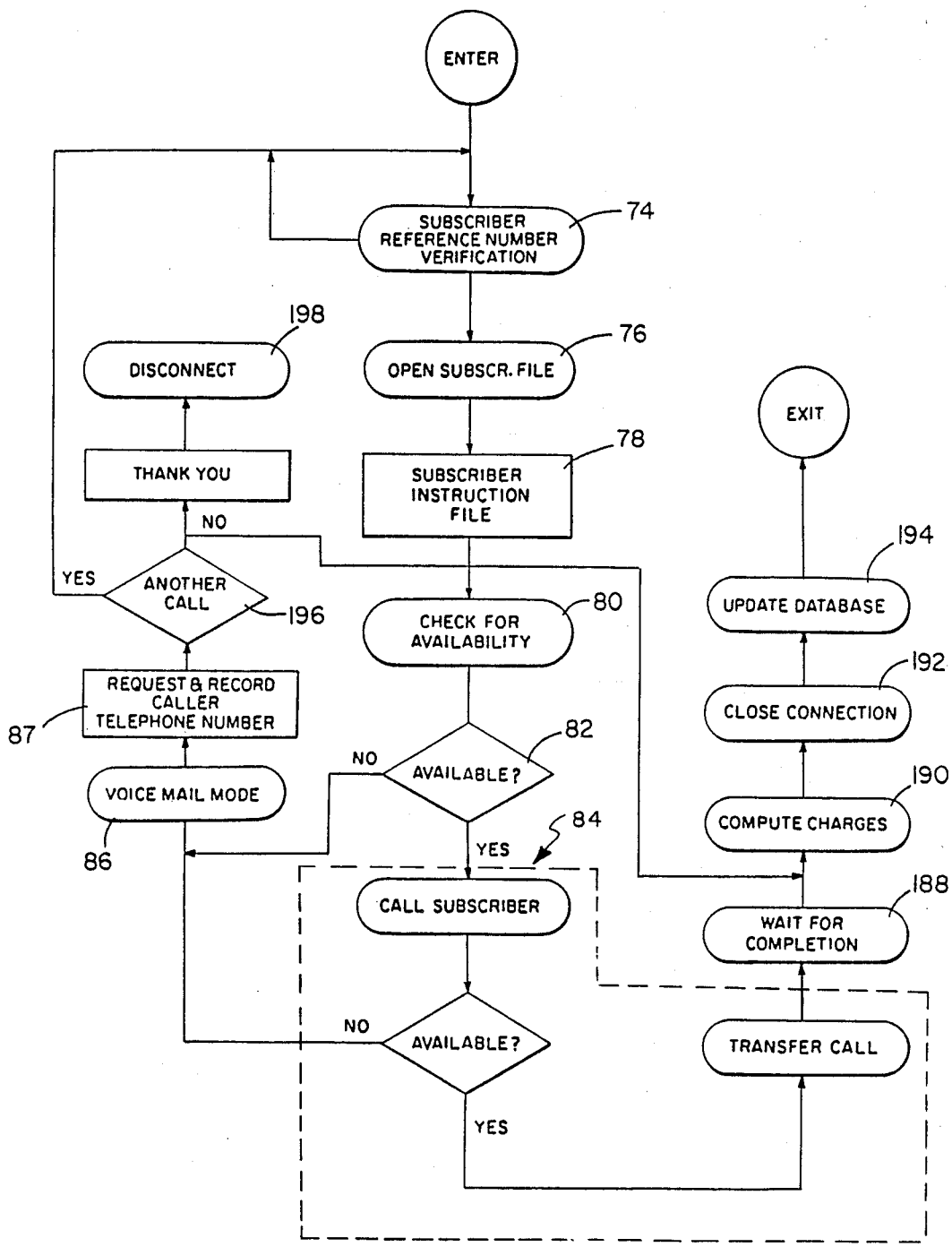

After credit verification, the system enters the confidential subscriber contacting program 56 illustrated in FIG. 2B and requests the subscriber reference number from the caller. The SRN is Touch-Tone entered by the caller and such entry is verified as indicated at 74. The verification procedure 74 is similar to that detailed in FIG. 3 as previously described.

After SRN verification, the system issues a command at 76 (FIG. 2B) to access the subscriber instruction file 78. In accordance with one embodiment of the invention, the subscriber instruction file contains various parameters such as status, activity time, and caller message duration. Under the status parameter, the subscriber may instruct the system through a subscriber interfacing program hereinafter described, that the subscriber reference number is to be deactivated or activated. If deactivated, the system will not transfer calls or take messages, but will deliver to the caller an appropriate informational message by the voice prompting/recording and control system 32.

If the subscriber reference number is active, the system will transfer telephone calls from callers in accordance with the activity time and message duration parameters. In regard to the activity time parameter, the subscriber may furnish to the system the desired days of the week and the active hours during each day that calls will be accepted. With respect to receipt of caller messages, the message duration parameter will limit the duration of verbal messages within specified limits in order to accommodate limited time for message review. Information on the foregoing parameters of the subscriber instruction file 78 may be furnished to the caller by the voice prompting component of system 32. As a courtesy, and along with general information about the system, the caller is also advised by the system that it is checking to see if the requested subscriber is currently available. Such checking step is depicted at 80. As indicated by reference number 82. If the subscriber is available, a call transferring operation is initiated as depicted at 84. If the subscriber is not available, then the incoming call from the caller is transferred to a recorder under a speech recording operational mode 86, which could include the playing of a custom message from the subscriber, recorded as indicated at 222 in FIG. 6, and the telephone number of the caller is requested at 87 for a message to the subscriber.

In accordance with the preferred embodiment of this invention, the system 10 is designed to maximize the number of incoming calls it is able to handle. Under normal operations, the system 10 spends most of its time connecting a caller to a subscriber, or vice versa; therefore, to avoid the costly maintenance of such a static connection, the system 10 employs certain switching features, through a service known as "Centrex", provided by the public telephone company 11 at the digital switch 18. As a result, all static connections between caller and subscriber are maintained by the telephone company's digital switch 18, and the number of calls simultaneously permitted is limited only by the capacity of the telephone company's local network, usually more than 100,000 lines.

Figure 4:
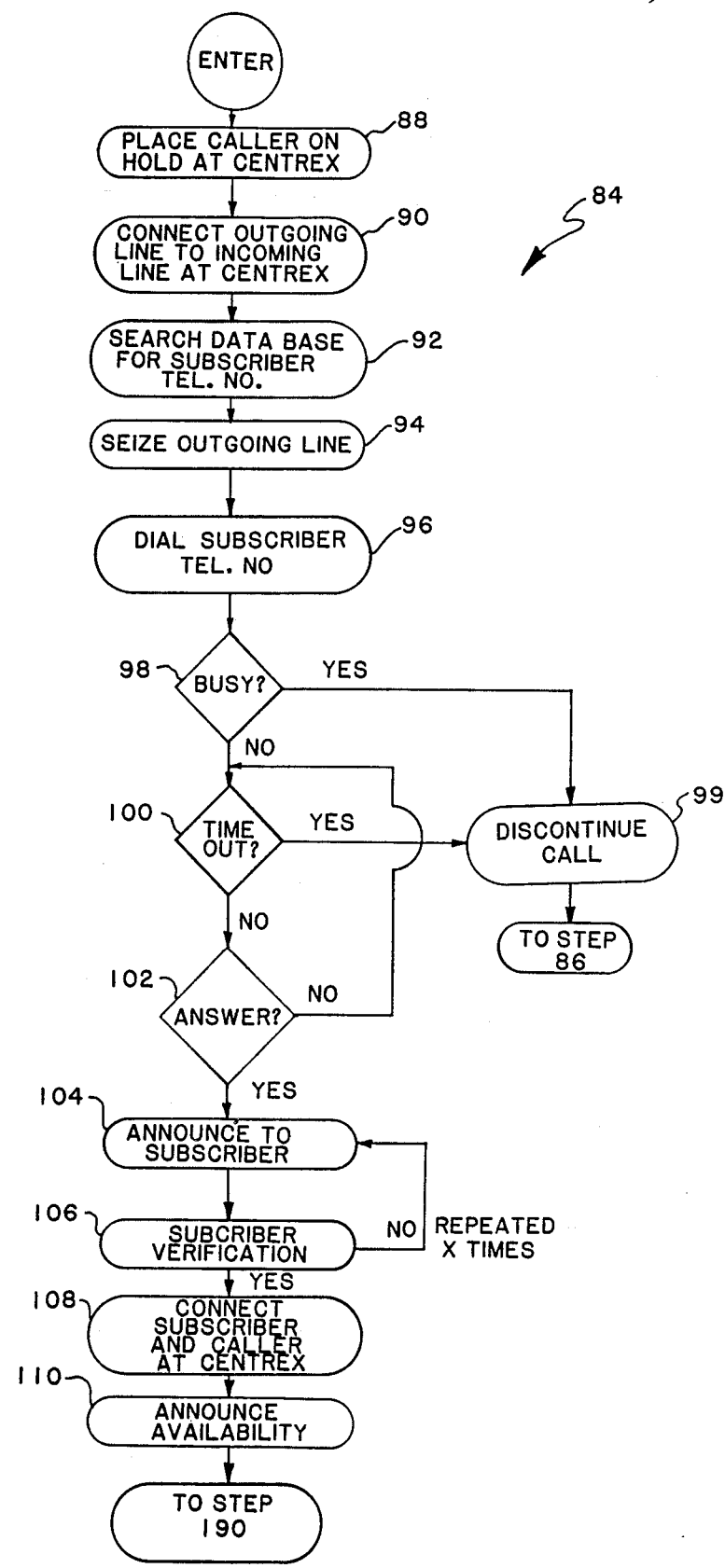

FIG. 4 illustrates in greater detail the program associated with the call transferring operation. After it is determined that the subscriber is available in step 82, the voice prompting/recording and control system 32 asks the caller to hold, and hook flashes the incoming line of the caller to place the call on hold at the phone company's central office. The central office also connects an outgoing line to the voice prompting recording system 32 and signals this connection by providing a dial tone. Concurrently, a search of the database at 92 is made for the subscriber's telephone number corresponding to the SRN entered by the caller. The subscriber is then called in step 96 and step 98 determines whether the subscriber's line is busy. If the line is busy, the routine is exited via step 99, disconnecting from the subscriber and connecting back to the caller. Otherwise, a predetermined amount of time for the subscriber to answer the call is provided in steps 100 and 102. If the call is not answered within this allotted time period the routine is exited via step 99, disconnecting from the subscriber and connecting back to the caller. Otherwise, the call is answered and the answering subscriber is prompted in step 104 to enter his or her personal access code, telephone number, or subscriber reference number, by Touch-Tone input for verification in step 106. Following verification, the voice prompting/recording and control system 32 hook flashes this line to connect the caller to the subscriber at the telephone company's central office in step 108. The voice prompting/recording and control system 32 then announces that the subscriber and the caller are now connected in step 110. Once the connection between the caller and subscriber is established, a charge computation step 190 then ensues, followed by a disconnection operation 192. A database update operation 194 completes the caller interfacing program. The system 10 then is removed from the loop and the phone company's central switching equipment maintains the static connection between the caller and subscriber. Thus, the system 10 has freed this line for the next incoming call.

In the event the subscriber to whom a call is to be transferred is not available, then a message recording mode ensues as indicated by reference number 86 in FIG. 2B. Following such message recording operation, the caller may select another subscriber as indicated by reference number 196. In such case, another interfacing program is initiated, bypassing the data verification portion thereof. In the event that no other call is to be initiated, as indicated by decision 196, then the program proceeds to computation, connection closing, and database update steps 190, 192 and 194 respectively, before the caller interfacing program is completed.

Figure 5:
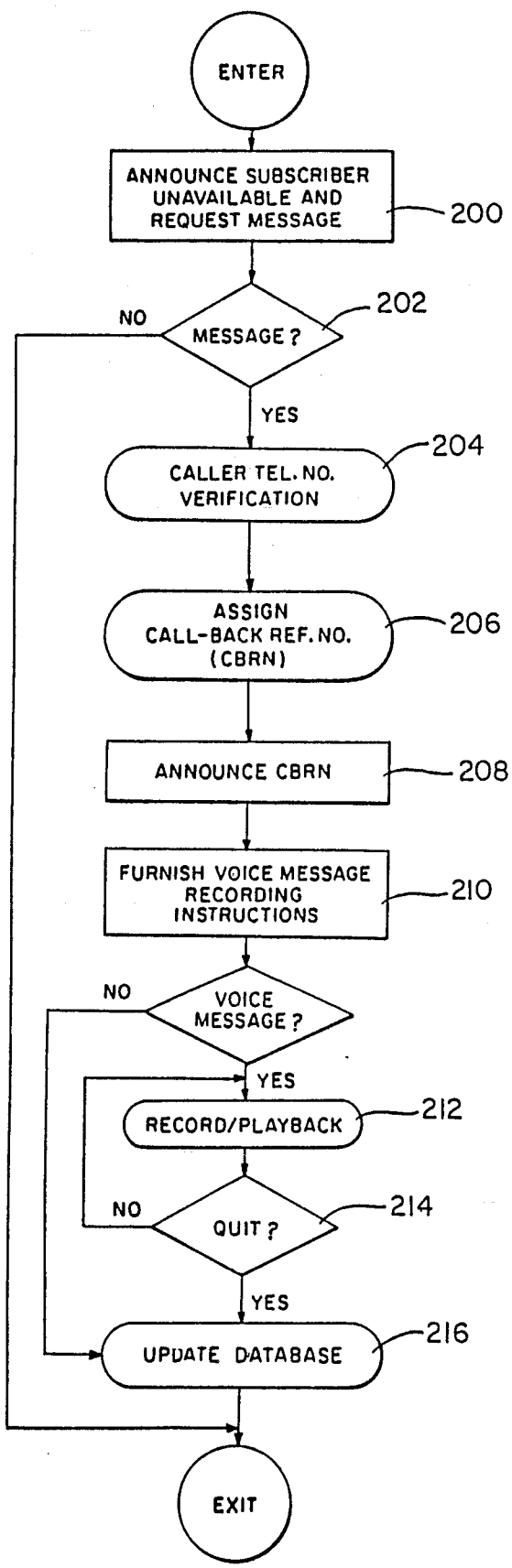

FIG. 5 illustrates the program for the message recording mode of operation. Such operational mode, which permits total anonymity, if desired, is initiated with an announcement from the speech prompting component of system 32 to the caller that the subscriber is unavailable and a message can be left as indicated by reference number 200. If no message is desired, the program terminates and the call is disconnected as previously described with respect to FIG. 2B. On the other hand, if the caller wishes to leave a message, as indicated at decision 202, the caller telephone number is requested and then verified by a verification operation as indicated by reference number 204. A call back reference number is assigned as indicated at 206 and is indexed to the caller's telephone number. Additionally, the caller information is indexed to the particular subscriber to whom the call was placed. The assigned call back reference number is announced to the caller as indicated at 208, followed by the furnishing of voice message recording instructions as indicated at 210. A recording and playback operation 212 then ensues. The caller is then given the option, as indicated at 214, of either accepting or rejecting the recorded message. If the recorded message is rejected, another record/playback session occurs. Once the caller hangs up at the end of the record/playback session, the message recording mode is terminated and the database is updated as indicated at 216. If the caller does not require anonymity, he or she may, in the recording or playback operation 212, provide his or her name, telephone number, etc., for the subscriber.

Figure 6:
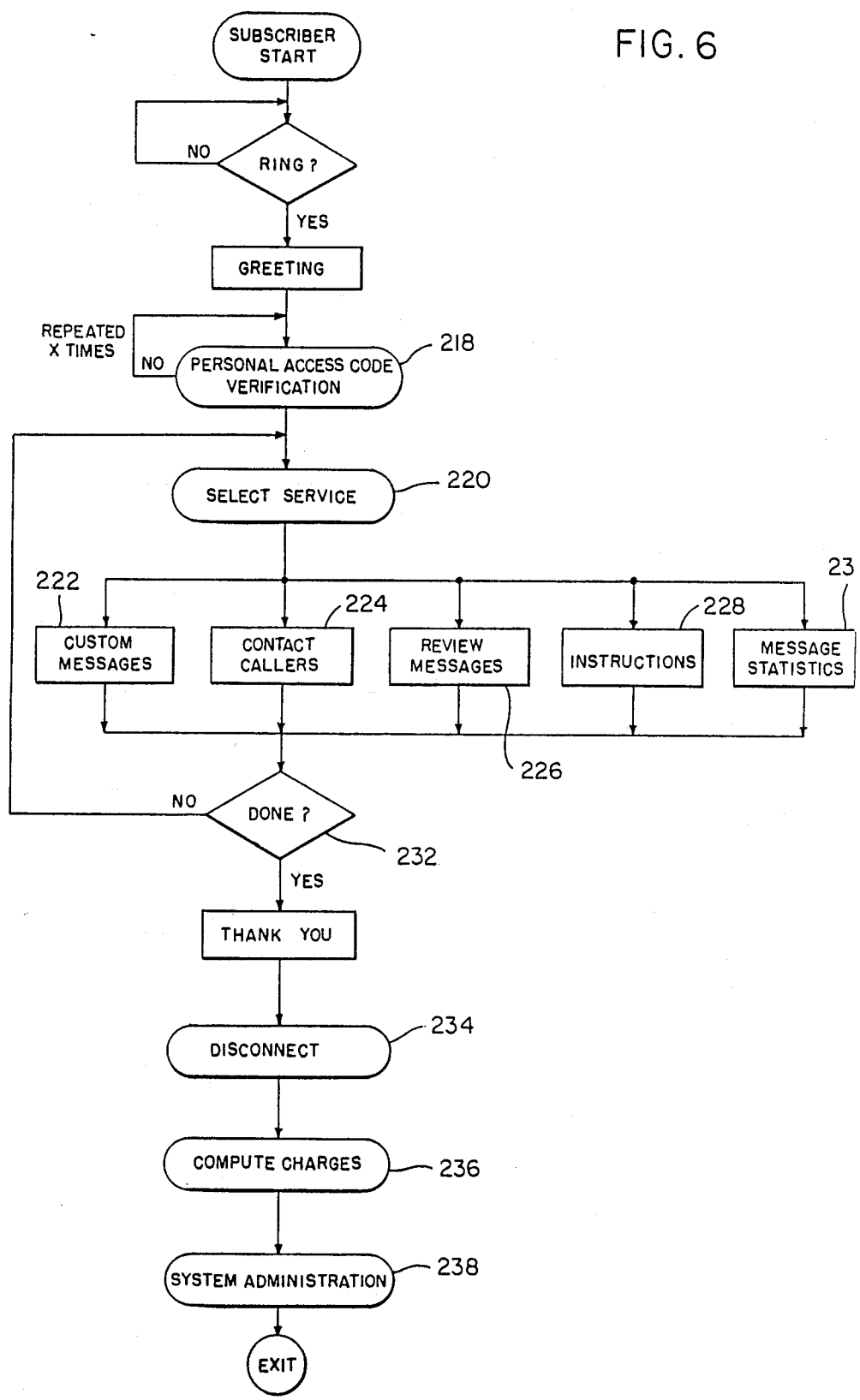
FIG. 6 is a flow chart diagram illustrating the subscriber interfacing program associated with the telephone system depicted

FIG. 6 illustrates the subscriber interfacing program initiated by an incoming call to the system 10 from a subscriber station 14 through the subscriber port B. Such an incoming call is met by a greeting originating from the speech prompting component of system 32 similar to the incoming call program illustrated in FIG. 2 with respect to the caller station 14. The subscriber is then prompted to enter by Touch-Tone input, an access code which is either the same as the published subscriber reference number, or if more security is desired, an unpublished code given to the subscriber when initiating the service, or perhaps even the subscriber's own telephone number. The access code is then verified at 218.

Upon verification of the access code of the subscriber, the subscriber may make a selection from a variety of services pursuant to a service selection program 220. In accordance with the embodiment illustrated in FIG. 6, the menu of services includes a custom message service 222, a contact caller service 224, a message review service 226, an instruction entry service 228 and a message statistic service 230. After the selected services are performed, the program continues as indicated at 232 to a disconnect operation 234. This is followed by a charge computing step 236 and a system administration step 238. The system is then reset to receive another incoming call from a subscriber.

Figure 7:
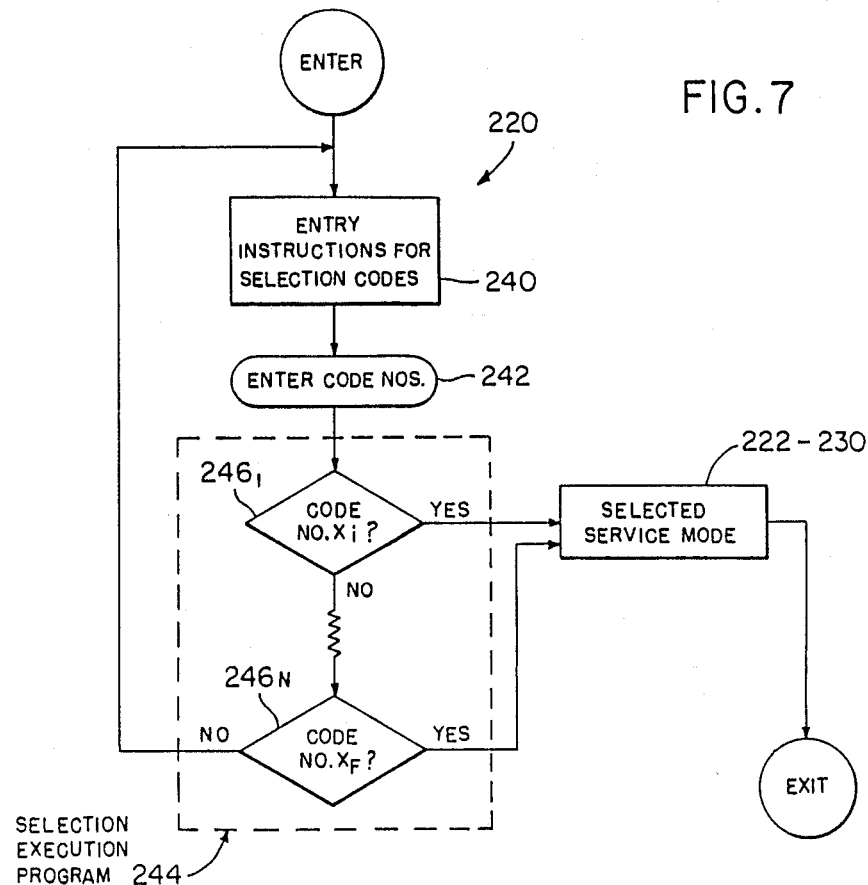
FIGS. 7, 8, 9, 10, 10A, 11 and 12 are flow chart diagrams illustrating in greater detail portions of the interfacing program illustrated in FIG. 6.

The service selection program 220 previously referred to in FIG. 6 is illustrated in greater detail in FIG. 7. The program is initiated by speech prompting information transmitted at 240 to the subscriber for entering his or her code instructions. The subscriber then enters a selection code number as indicated at 242 in order to initiate a selection execution program 244. The selection execution program 244 consists of a plurality of decision steps $246_1$-$246_n$, the number of code decision steps in the illustrated embodiment being five as depicted in FIG. 6.

Figure 8:
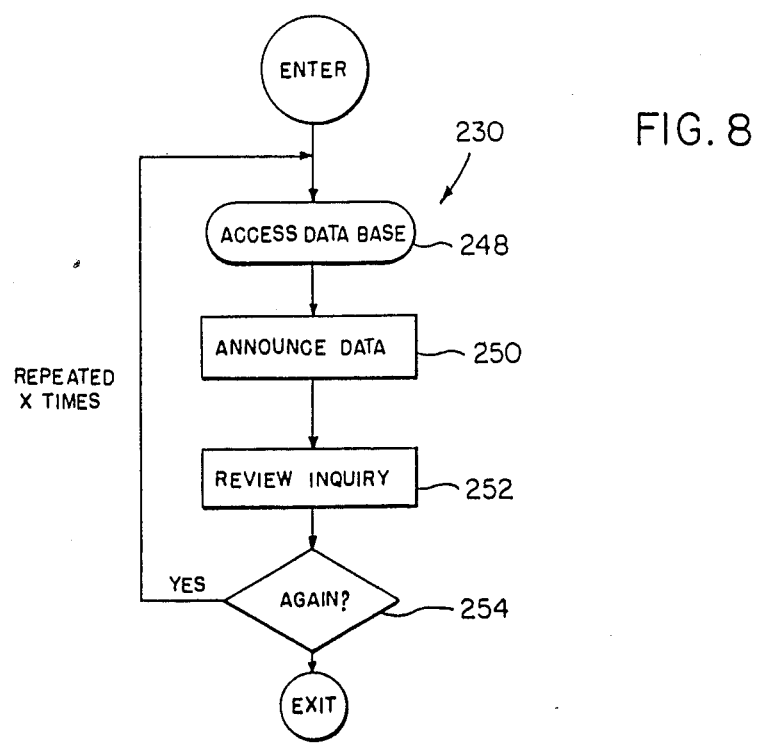

The program associated with the message statistic service 230 is illustrated in detail in FIG. 8. Such program is initiated by an operation providing access to the system database as indicated by reference number 248 followed by an announcement to the subscriber of the message statistic data as indicated at 250. The subscriber can then control the review of such data through speech prompting instructions as indicated at step 252. The procedure is optionally repeated as indicated at 254 before the message statistic program is terminated.

Figure 9:
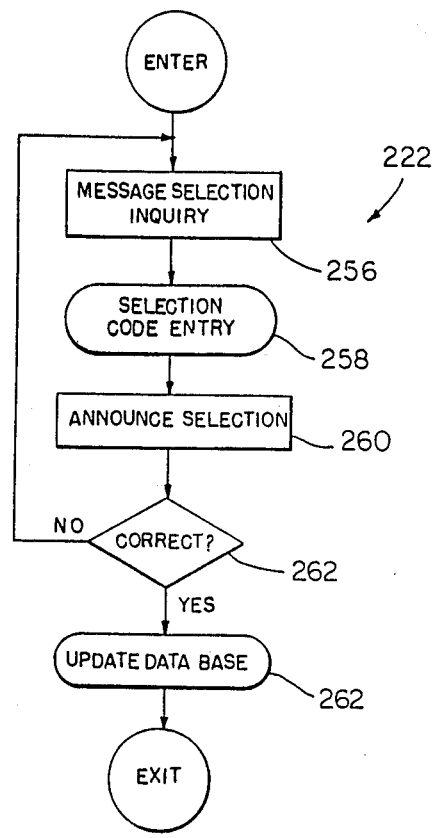

FIG. 9 illustrates in detail the custom message program 222. This program is initiated by a speech prompting message to the calling subscriber inquiring as to message selection, as indicated by reference number 256. The subscriber then enters a selection code as indicated at 258 which is followed by an announcement at 260 of the selection made. If a correct code selection is indicated as denoted by reference number 262, the program is terminated by an update database operation 264.

Figure 10:
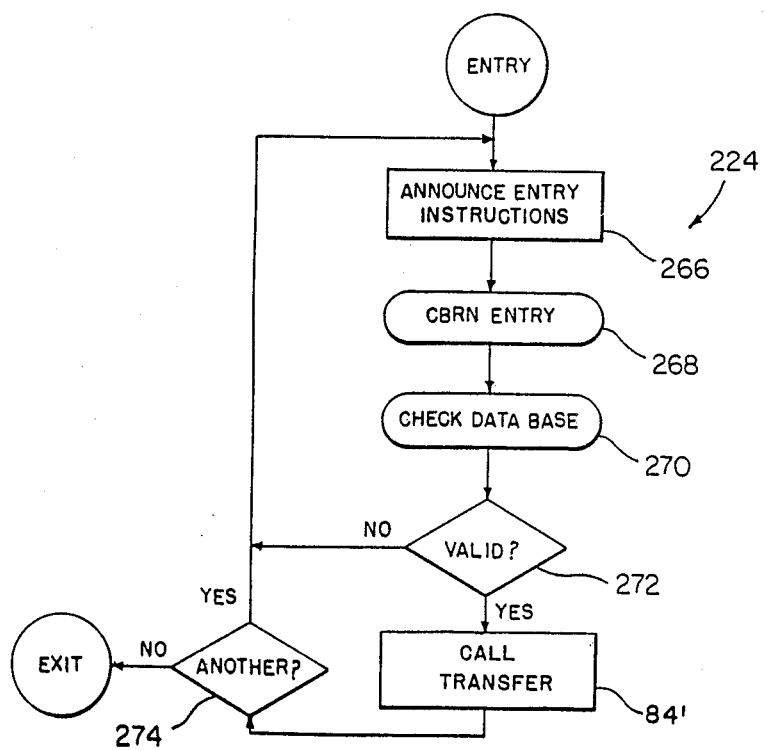

Subroutine 224 for a subscriber to return the call of a caller is illustrated in greater detail in FIG. 10. This program is initiated by speech prompting announcement to the subscriber providing instructions for entry of information as indicated by reference number 266. The subscriber then enters a desired call back reference number as indicated at 268 followed by a database check 270. If the call back reference number entered by the subscriber is valid as indicated at 272, the telephone call from the subscriber is directed to the desired caller's station in accordance with a call transferring routine 84'.

Figure 10A:
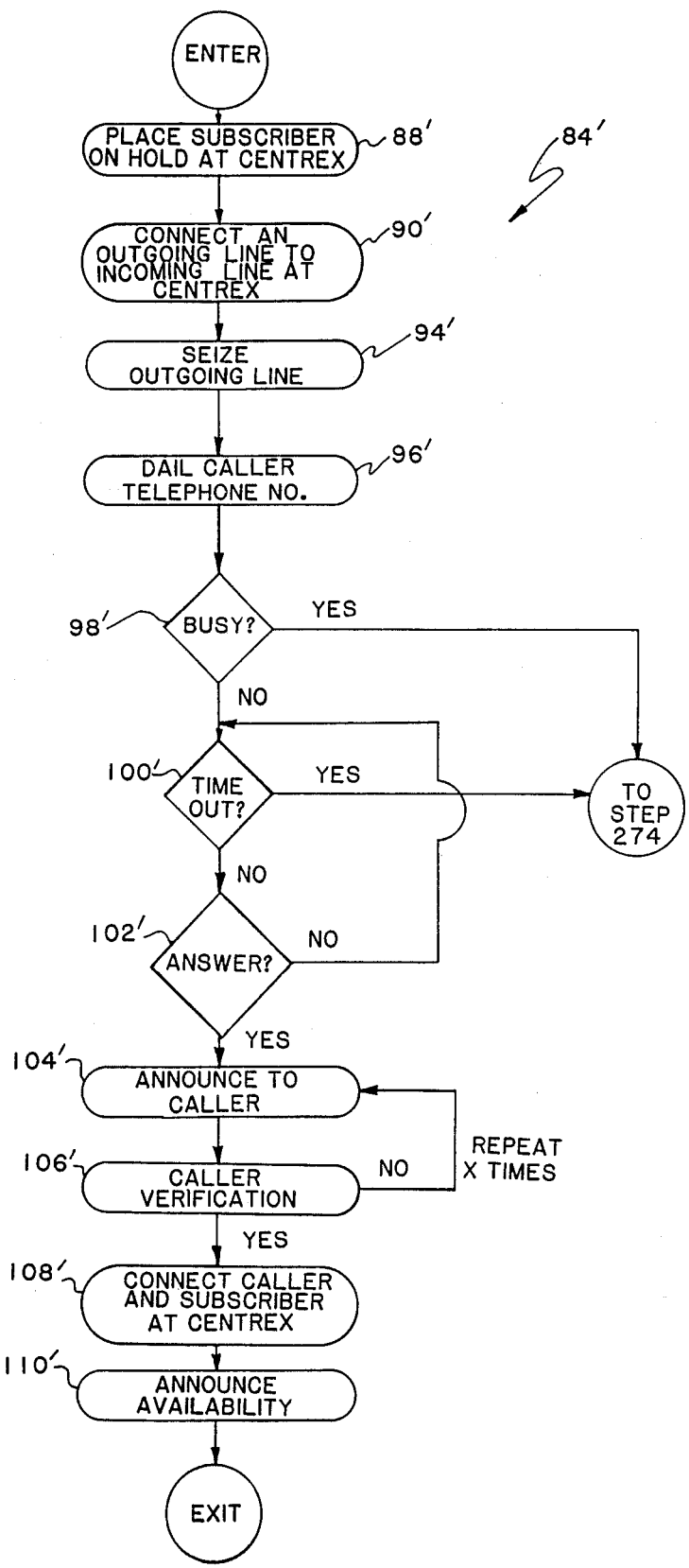

FIG. 10A shows the detailed flow diagram of the call transferring routine 84'. For the most part, routine 84' is carried out in a manner parallel to routine 84 previously described in detail when reference was made to FIG. 4. Therefore, the step-by-step description of call transferring routine 84' will not be set out herein.

Figure 11:
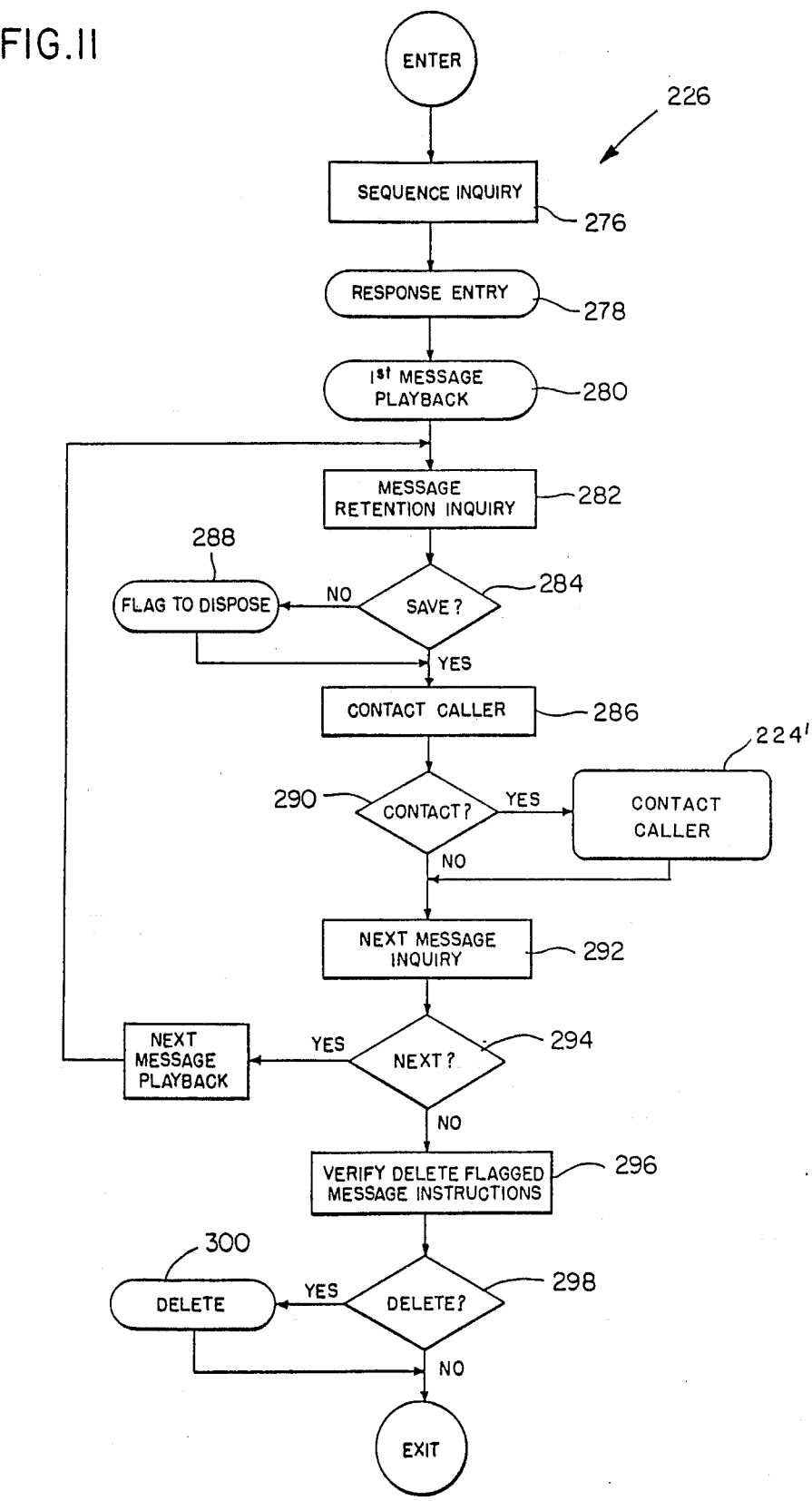

FIG. 11 illustrates in greater detail the message review program 226 initiated by an inquiry from the subscriber. The first step is a speech prompting message to the calling subscriber as indicated by reference number 276. The speech prompting message prompts the subscriber as to his or her option for handling the messages recorded by the system. The subscriber then enters a choice as indicated at 278 which is followed by a message playback operation 280. The entry indicated at 278 enables the subscriber to select the order in which the messages are played back. After the first message is played back the system inquires as to whether such message is to be retained as indicated by reference number 282. If the message just reviewed is to be retained, the program proceeds through step 284 to a step 286 in which the speech prompting recording system 32 asks the subscriber whether to contact the caller who left such message. On the other hand, if the message just reviewed is to be deleted, it is flagged for subsequent deletion as indicated at 288.

After inquiry is made as to contacting the caller, the program either proceeds through step 290 to a contact caller subroutine 224' in which the subscriber attempts to reach the caller exactly as described in subroutine 224 detailed in FIGS. 10 and 10A, or proceeds directly to the next message inquiry 292. The program then proceeds through step 294 either to the beginning of another message review program or to a message deletion operation 296 wherein the speech prompting system informs the subscriber of the imminent deletion of the previously flagged messages. If it is confirmed that the flagged messages are to be deleted, the program proceeds through step 298 to a conclusion or to a message deletion operation 300 before the program is completed.

Figure 12:
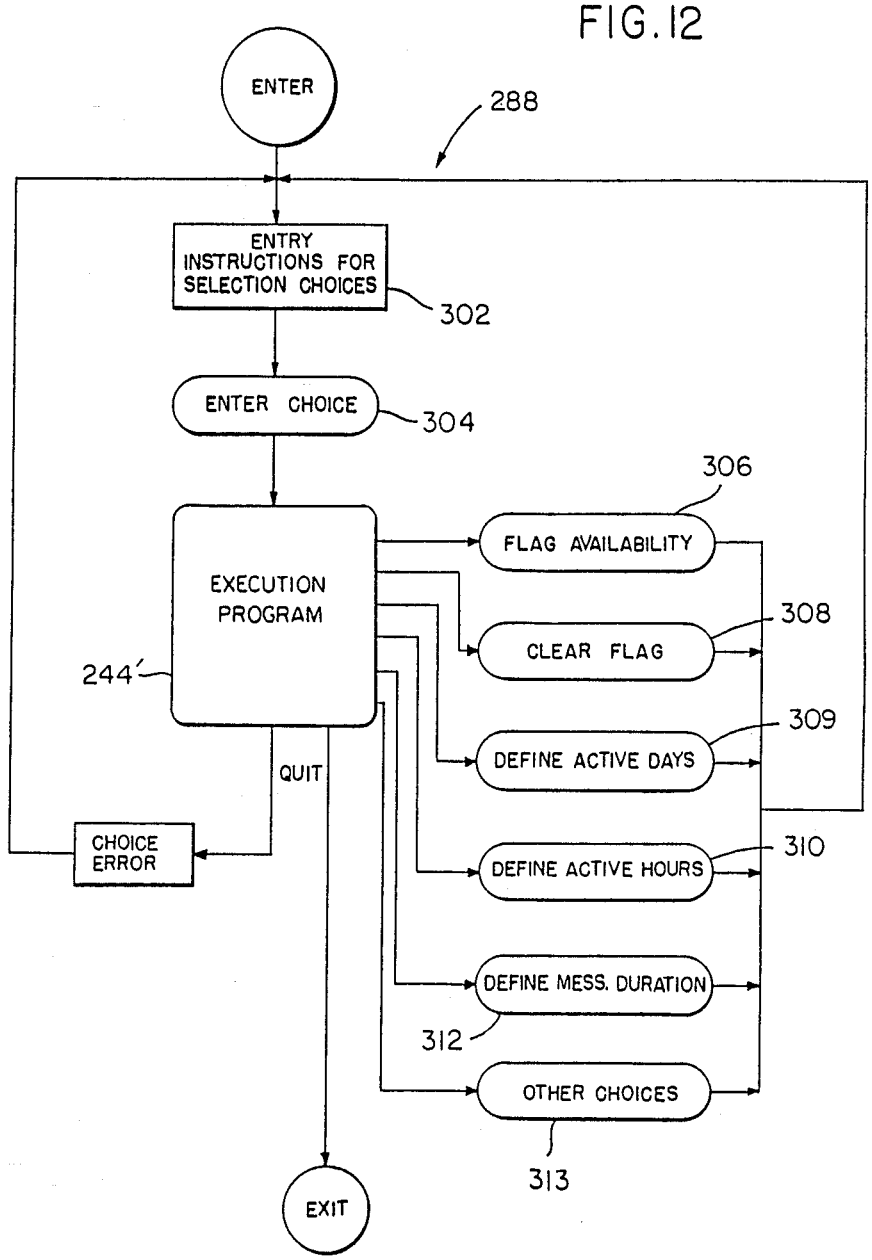

FIG. 12 illustrates in greater detail the instruction selection program 228 which is used by the subscriber to program when calls are to be received. The program is initiated by instruction given to the subscriber as indicated by reference number 302. The subscriber then enters a selection code as indicated at 304 to initiate a selection execution program 244' as hereinbefore described with respect to FIG. 7. Thus, depending upon the entered code, one of the five instruction parameters, 306, 308, 309, 310 and 312, is selected for entry into the instruction file 78 as previously described with respect to FIG. 2B. As an indication that more than five instruction parameters can be used, FIG. 12 illustrates at 313 that other choices may be included in the system.

Furthermore, the technique of employing the call holding and connecting features provided by the local telephone company can be applied to other telephone systems such as, for example, telephone answering systems.

The above description is not intended to limit the present invention in any way except as set forth in the following claims.

What is claimed:

1. A telephone communication method for anonymously connecting a subscriber station and a caller station via public telephone lines controlled by a public telephone company central switching station having the capability of connecting together select ones of the public telephone lines, the method including the steps of:
   storing data at a system controller station that is received from a plurality of subscriber stations, such data including the telephone number of each subscriber station and a corresponding reference number for each subscriber station;
   publishing the telephone number of said system controller station in advertisements including the reference numbers for the respective subscriber stations;
   receiving a call from a caller station to said system controller station;
   receiving a published reference number from said caller station in communication with said system controller station;
   matching said received published reference number with the telephone number of the corresponding subscriber station;
   automatically connecting the telephone call received from said caller station at the system controller station to said corresponding subscriber station, said connecting being accomplished at said public telephone company central switching station, under the control of said system controller station; and
   disconnecting said system controller station from the caller station, the subscriber station, and the public telephone company central switching station, so that after said caller station and said subscriber station are connected together on their respective public telephone lines, the public telephone company central switching station maintains the connection between the caller and subscriber stations.

2. The method of claim 1 and further including the step of storing call transferring instructions as programmed by each subscriber station.

3. The method of claim 1 and further comprising the step of recording a message from said caller station if said corresponding subscriber station is unavailable to receive a call, such recorded message including a call back reference number of said caller station that is indexed to a stored telephone number of said caller station.

4. The method of claim 3 including the step of enabling each subscriber station to review appropriate recorded messages, including the call back reference number but not the telephone number of each caller.

5. The method of claim 3 wherein each subscriber station is provided with a telephone number to access said system controller station, and wherein each subscriber station calling said system controller station can be anonymously connected to appropriate caller stations by supplying said call back reference numbers.

6. The method of claim 3 wherein said call back reference number is generated by said system controller station.

7. The method of claim 1 and further comprising the step of recording a message from said caller station if the subscriber at said corresponding subscriber station is unavailable to receive a call.

8. The method of claim 7 including the step of enabling each subscriber station to review recorded messages.

9. The method of claim 1 and further comprising the step of announcing to the caller the availability times of the subscriber.

10. The method of claim 1 wherein data received from a caller station is stored at the system controller, such data including the telephone number of the caller station.

11. The method of claim 1 and further comprising the step of receiving data from a caller station such as to enable the caller station to become a subscriber station.

12. A method of anonymously connecting a caller to a subscriber over public telephone lines, the method comprising the steps of:
   providing a published telephone number of a system controller;
   storing in said system controller the telephone numbers of a plurality of subscribers;
   assigning to each subscriber a subscriber reference number, indexed to the subscriber's telephone number;
   publishing an ad for each subscriber that contains a message and the subscriber's reference number;
   receiving calls from callers at the system controller through the means of said published telephone number;
   receiving a subscriber's reference number from a caller;
   recording a message from a caller; and
   providing the message to said subscriber.

13. A method of connecting a caller to a subscriber over public telephone lines controlled by a remote central switching station having the capability of connecting together select ones of said public telephone lines, the method comprising the steps
   (a) publishing the telephone number of a system controller station;
   (b) storing telephone numbers of subscribers and indexing such telephone numbers to corresponding published subscriber identifiers;
   (c) receiving a call at said system controller station through the means of said published telephone number, and receiving from the caller a published subscriber identifier corresponding to a desired subscriber;

(d) placing the caller on hold at the remote central switching station;

(e) indexing the received subscriber identifier to the corresponding subscriber telephone number and calling such telephone number;

(f) connecting said subscriber to said caller at the remote central switching station; and (g) disconnecting the system controller station from the remote central switching station.

14. A telephone communication method for anonymously connecting a subscriber station and a caller station via public telephone lines controlled by a public telephone company central switching station having the capability of connecting together select ones of the public telephone lines, the method including the steps of:

storing data at a system controller station that is received from a plurality of subscriber stations, such data including the telephone number of each subscriber station and a corresponding reference number for each subscriber station;

publishing the telephone number of said system controller station in advertisements including the reference numbers for the respective subscriber stations;

receiving a call from a caller station to said system controller station;

receiving a published reference number from said caller station in communication with said system controller station;

matching said received published reference number with the telephone number of the corresponding subscriber station;

automatically connecting the telephone call received from said caller station at the system controller station to said corresponding subscriber station depending upon the status of said received published reference number, said connecting being accomplished at said public telephone company central switching station, under the control of said system controller station;

disconnecting said system controller station from the caller station, the subscriber station, and the public telephone company central switching station, so that after said caller station and said subscriber station are connected together on their respective public telephone lines, the public telephone company central switching station maintains the connection between the caller and subscriber stations; and wherein the received published reference number from said caller station must be an active and valid number to enable communication between said subscriber station and said caller station.

15. The method of claim 14 wherein the published reference number can be made inactive by said subscriber at said station.

16. A telephone communication method for anonymously connecting a subscriber station and a caller station via public telephone lines controlled by a public telephone company central switching station having the capability of connecting together select ones of the public telephone lines, the method including the steps of:

storing data at a system controller station that is received from a plurality of subscriber stations, such data including the telephone number of each subscriber station and a corresponding reference number for each subscriber station;

publishing the telephone number of said system controller station in advertisements including the reference numbers for the respective subscriber stations;

receiving a call from a caller station to said system controller station;

receiving a published reference number from said caller station in communication with said system controller station;

matching said received published reference number with the telephone number of the corresponding subscriber station;

automatically connecting the telephone call received from said caller station at the system controller station to said corresponding subscriber station depending upon the availability of said subscriber, said connecting being accomplished at said public telephone company central switching station, under the control of said system controller station;

disconnecting said system controller station from the caller station, the subscriber station, and the public telephone company central switching station, so that after said caller station and said subscriber station are connected together on their respective public telephone lines, the public telephone company central switching station maintains the connection between the caller and subscriber stations; and recording a message from said caller station if said corresponding subscriber station is unavailable to receive a call.

17. The method of claim 16 including the step of enabling the subscriber at said subscriber station to review recorded messages.

* * * * *